G. E. NEUBERTH.
MACHINE FOR MAKING SEAMLESS TUBING OF METAL, PULP, OR OTHER MATERIALS.
APPLICATION FILED NOV. 16, 1917.
1,285,328. Patented Nov. 19, 1918.
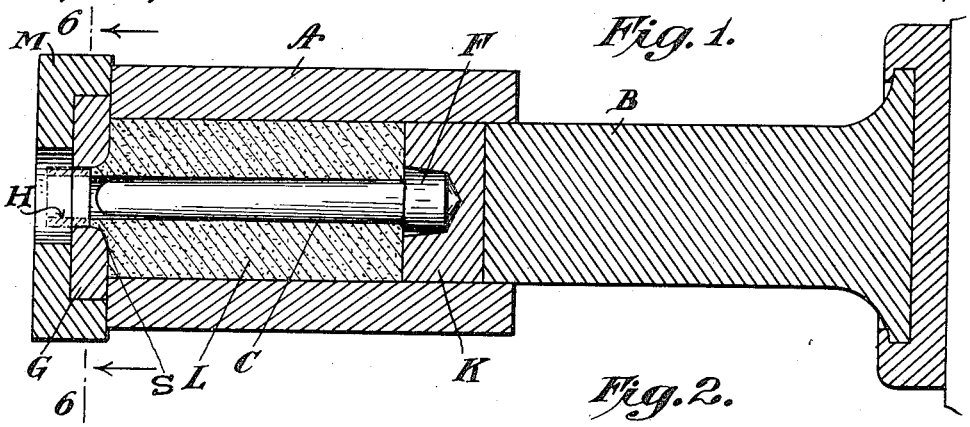
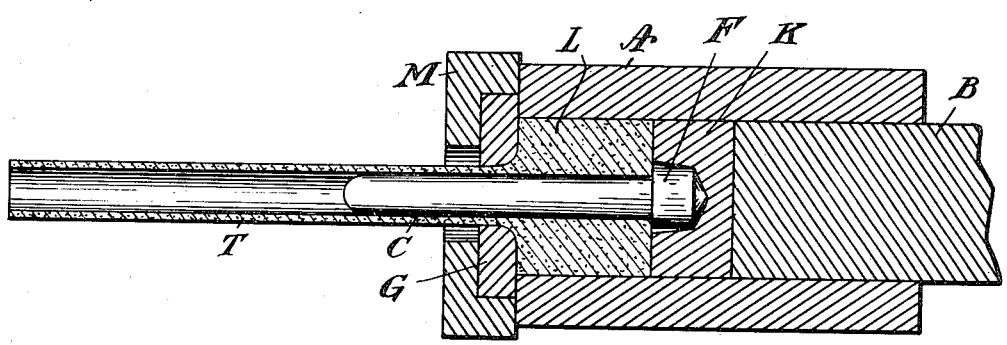
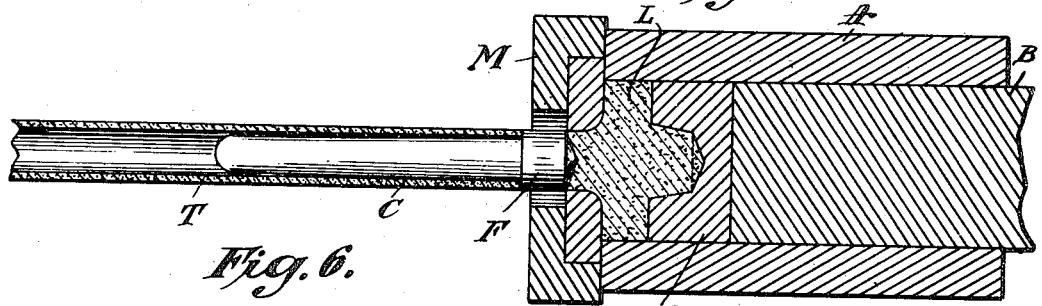
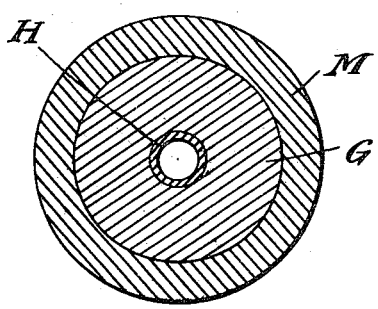
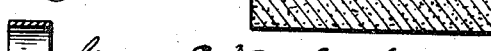
George E. Neuberth
Inventor:
by James J. Watson
Atty.

UNITED STATES PATENT OFFICE.

GEORGE E. NEUBERTH, OF NEWARK, NEW JERSEY.

MACHINE FOR MAKING SEAMLESS TUBING OF METAL, PULP, OR OTHER MATERIALS.

1,285,328.

Specification of Letters Patent.  Patented Nov. 19, 1918.

Application filed November 16, 1917.  Serial No. 202,305.

*To all whom it may concern:*

Be it known that I, GEORGE E. NEUBERTH, a citizen of the United States, residing at and whose postoffice address is No. 834 South Thirteenth street, in the city of Newark, county of Essex, and State of New Jersey, have invented a new and useful Machine for Making Seamless Tubing of Metal, Pulp, or other Materials, of which the following is a specification.

My invention relates to improvements in machines for making seamless tubing, which substantially reduce the cost of manufacture.

I attain the objects of my invention by mechanism, one form of which is illustrated in the accompanying drawing, in which—

Figure 1 is a vertical section of the machine; Fig. 2 is a vertical section of the machine showing the position of the parts after the operation has started but not finished; Fig. 3 is a vertical section of the machine showing the position of the parts of the mechanism at the conclusion of the extruding of tubing; Fig. 4 is a portion of the hollow billet showing a preferred form of the hollow billet used for making the tubing; Fig. 5 is a ring or ferrule, preferably of metal, used when plastic or ground material is made into tubing; Fig. 6 a cross sectional view of the machine through cross section 6—6 of Fig. 1.

Similar letters refer to similar parts throughout the several views.

As shown in the drawing, the cylinder, A, is mounted on a hydraulic press whose ram or plunger, B, has an outer diameter of the same size as the interior diameter of the cylinder, A. The cylinder, A, has a diameter of a size to receive a hollow billet of the metal or material to be made into tubing. At the end of the cylinder, A, opposite to the ram, B, is secured the die, G, which has an opening through which the tubing is extruded. I provide a re-usable cylindrical arbor or core, C, of hard, heat-resisting steel, or other suitable hard, heat-resisting material, of such diameter as may be desired for the interior diameter of the tubing to be extruded, which arbor is preferably provided at the ram end with an enlargement, or head, F, of a diameter equal to the diameter of the opening in the die, G. By slightly tapering the arbor, C, (the taper of the arbor being exaggerated in the drawing) from its head toward its other end the amount of the billet extruded in tubing is greatly increased, the strain on the arbor is greatly diminished and danger of injuring the arbor practically eliminated. If the arbor is straight, that is, not tapered, the arbor passes out of the cylinder, A, much faster than when the arbor is tapered; also when the arbor is straight, that is not tapered, the strain on the arbor is excessive and is liable to injure the arbor. With a straight arbor, using an ordinary rod-extruding machine, only short pieces of tubing can be extruded, but with a tapered arbor twenty to twenty-two inches long, used in an ordinary rod-extruding machine, tubing of twenty to twenty-four feet long can be extruded, or about one foot to each inch of arbor. This tapering of the arbor produces another advantage in that it produces tubes which have interior diameter with a slight taper of about one-thirty-second to one-sixteenth inch in a length of twenty to twenty-four feet; this taper permits the insertion of the drawing rod or templet without the effort or difficulty commonly experienced when the interior diameters are straight. To attain these results it is only necessary to give the arbor or mandrel a slight taper, as, for example, one-quarter of an inch between its tip end and its head, although the objects of my invention may be attained by a greater or even less degree of taper. The arbor, in all cases, is smallest at its tip end, gradually increasing in diameter toward its head. In front of the ram, B, I provide a dummy block, or ring, K, of hard, heat-resisting steel, or other suitable hard, heat-resisting material, which dummy block on its side opposite the ram preferably has a recess or other convenient means of a size to receive and center the end of the head, F, of the arbor, C, as shown in Fig. 1. This dummy block, K, may be secured to the ram, B, or may be an integral part thereof, or may be a separate ring. The cylinder head, M, which holds the die, G, is removably secured to the cylinder, A, in the ordinary manner.

The method of operation of my device is:

The plunger of the press is drawn back out of the cylinder, A, to admit of the insertion in the cylinder, A, of a hollow billet, L, which, in the case of metal, is heated as hot as possible and still retain its shape. The billet, L, is inserted in the cylinder, A, with the arbor, C, in the hollow of the billet.

The dummy block, K, is placed against the billet with the end or head, F, of the arbor, C, centered in the cylinder, A, by having its end or head, F, inclosed in the recess provided in the dummy block, K, or by other convenient means, and the plunger, B, is brought forward against the rear of the dummy block, as shown in Fig. 1. Pressure is then applied to the plunger, B, thereby forcing the material of the billet, L, and also the arbor, C, out through the circular opening in the die, G, the metal being thereby extruded in a continuous seamless tube. Fig. 1 shows the parts of the mechanism with the billet in place at the beginning of the operation; Fig. 2 shows the position of the parts of the mechanism at a point in the operation when a portion of the billet has been extruded in the form of tubing; and Fig. 3 shows the position of the parts of the mechanism at the conclusion of the extruding of tubing from the cylinder, A. The motion of the metal of the billet, in the extruding process, separates the arbor, C, from the dummy block, K, until, at the conclusion of the extruding of tubing, the parts are in the approximately relative position shown in Fig. 3. An arbor may be employed without a head but I prefer an arbor with a head and a dummy block with a recess for receiving the head and centering the arbor, as shown in Fig. 1. As the head of the arbor, C, passes through the opening in the die, G, it cuts the extruding metal, thereby forming the end of the tube. The arbor, C, is then removed from the tubing by a blow on its front end, the tapering of the arbor, C, facilitates its removal from the tubing. The cylinder-head, M, is then removed, and, by means of the ram, the dummy block, K, and the portion of the billet still remaining in the cylinder are forced from the cylinder, A. The ram is then withdrawn, the parts replaced and the operation repeated.

Tubing may be extruded by the mechanism and process here described, without extruding the arbor entirely from the cylinder, A, and without a head, F, to the arbor, but the construction shown in the drawing is one of the preferred forms of my invention.

I have found in practice that the operation is facilitated by providing a form of hollow billet which can be centered in the cylinder, A, at the beginning of the operation, one of the preferred forms of which is shown in Fig. 4. The circular projection, P, drops into the recess, S, and facilitates the centering of the billet and arbor, C, in the cylinder, A, at the beginning of the operation, which assures a tubing of uniform thickness.

I have also found it convenient in practice to provide the recess in the dummy block, K, (or in the outer side of the head of the ram) for the head, F, of the arbor, C; by this construction a positive centering of the rear end of the arbor, C, is secured, but it is obvious that such centering may be obtained by other construction. I have also found in practice, particularly in the case of metals, that if the head of the arbor, C, is inserted for a short distance into the dummy block, that a greater proportion of the contents of the billet is extruded in tubing.

The form of the mechanism, which I have shown and described, is only one form in which my invention may be embodied; it is obvious that other forms may be used without departing from my invention.

It is obvious that with certain metals it is not necessary to heat them, as they may be extruded cold. It is also obvious that with certain materials, paper pulp for example, it is not necessary that they be first made into billets but that they may be placed in the cylinder in a plastic or ground condition, either alone or mixed with proper binding material, and then extruded. With materials of the latter character, it is preferable, at the outset of the operation, to secure the arbor, C, in the center of the die, G, by inserting a ring or ferrule, H, Fig. 5, in the die-opening in the die, G, before the material is placed in the cylinder. When the ferrule, H, is used, it incloses the lower end of the arbor, C, thereby holding it centered in the die-opening, G, at the beginning of the operation. When pressure is applied, the material in the cylinder, A, and the arbor, C, forces out the ferrule, H, leaving the arbor, C, centered in the opening of the die, G, thereby assuring tubing of uniform thickness.

I claim:

1. In a machine for making seamless tubing, the combination of a cylinder open at one end and closed at the other end by a die, which has an opening in its center, a cylindrical tapered arbor centered in said cylinder, which arbor is of a diameter smaller than the opening in the die, and of a size to be inserted in the hollow of a billet placed in said cylinder, which arbor has a cylindrical head at its rear end of the same diameter as the diameter of the opening in said die, and means for forcing said arbor and the contents of said billet out of the opening in the die.

2. In a machine for making seamless tubing, the combination of a cylinder open at one end and closed at the other end by a die, which has an opening in its center, a cylindrical tapered arbor centered in said cylinder, which arbor is of a diameter smaller than the opening in said die, and of a size to be inserted in the hollow of a billet centered in said cylinder, which arbor has a cylindrical head at its rear end of the same diameter as the diameter of the opening in said die, and means for forcing said arbor and the contents of said billet out of the opening in said die.

3. In a machine for making seamless tubing, the combination of a cylinder open at one end and closed at the other end by a die, which has an opening in its center, a cylindrical tapered arbor of a diameter smaller than the opening in said die, and of a size to be inserted in the hollow of a billet, which arbor has a cylindrical head at its rear end of the same diameter as the diameter of the opening in the said die, means for centering said arbor and a hollow billet in said cylinder, and means for forcing said arbor and the contents of said billet out of the opening in said die.

4. In a machine for making seamless tubing, the combination of a cylinder open at one end and closed at the other end by a die, which has a circular opening in its center, a cylindrical tapered arbor centered in said cylinder, which arbor is of a diameter smaller than the opening in the die, and of a size to be inserted in the hollow of a billet placed in said cylinder, which arbor has a cylindrical head at its rear end of the same diameter as the diameter of the opening in said die, and means for forcing said arbor and the contents of said billet out of the opening in the die.

5. In a machine for making seamless tubing, the combination of a cylinder open at one end and closed at the other end by a die, which has a circular opening in its center, a cylindrical tapered arbor centered in said cylinder, which arbor is of a diameter smaller than the opening in said die, and of a size to be inserted in the hollow of a billet centered in said cylinder, which arbor has a cylindrical head at its rear end of the same diameter as the diameter of the opening in said die, and means for forcing said arbor and the contents of said billet out of the opening in said die.

6. In a machine for making seamless tubing, the combination of a cylinder open at one end and closed at the other end by a die, which has a circular opening in its center, a cylindrical tapered arbor of a diameter smaller than the opening in said die, and of a size to be inserted in the hollow of a billet, which arbor has a cylindrical head at its rear end of the same diameter as the diameter of the opening in the said die, means for centering said arbor and a hollow billet in said cylinder, and means for forcing said arbor and the contents of said billet out of the opening in said die.

GEORGE E. NEUBERTH.

Witnesses:
MARY STRONG,
F. A. SPAETH.